United States Patent

Binnig et al.

[11] Patent Number: 5,808,302
[45] Date of Patent: Sep. 15, 1998

[54] FINE POSITIONING APPARATUS WITH ATOMIC RESOLUTION

[75] Inventors: Gerd K. Binnig, Wollerau; Walter Haeberle, Wadenswil; Heinrich Rohrer, Richterswill, all of Switzerland; Douglas P. E. Smith, Cambridge, Mass.

[73] Assignee: International Business Machines Corporation, Armonk, N.Y.

[21] Appl. No.: 793,481
[22] PCT Filed: Aug. 27, 1994
[86] PCT No.: PCT/EP94/02844
§ 371 Date: Feb. 26, 1997
§ 102(e) Date: Feb. 26, 1997
[87] PCT Pub. No.: WO96/07074
PCT Pub. Date: Mar. 7, 1996
[51] Int. Cl.⁶ .................................................. H01J 37/00
[52] U.S. Cl. ........................................ 250/306; 250/442.11
[58] Field of Search ................................. 250/306, 442.11

[56] References Cited

U.S. PATENT DOCUMENTS

| 4,947,042 | 8/1990 | Nishioka et al. | 250/306 |
| 5,103,174 | 4/1992 | Wandass et al. | 250/306 |
| 5,375,087 | 12/1994 | Moreland et al. | 250/306 |
| 5,436,448 | 7/1995 | Hosaka et al. | 250/307 |

*Primary Examiner*—Bruce Anderson
*Attorney, Agent, or Firm*—James E. Murray

[57] ABSTRACT

A fine-positioning apparatus for a scanning probe microscope includes magnetic solenoid actuators for each of the x, y and z scanning axes of the microscope. The sample is mounted on the coil of one of the actuators for movement of the sample in the z direction while the tunnelling probe is attached to two other solenoid actuators for movement of the probe in the x and y directions.

18 Claims, 4 Drawing Sheets

FINE POSITIONING APPARATUS WITH ATOMIC RESOLUTION

The invention relates to a fine positioning apparatus with atomic resolution, in particular for scanning probe techniques or storage devices.

BACKGROUND OF THE INVENTION

One technical field of the invention are scanning probe techniques evolving from the discovery of the Scanning Tunneling Microscope (STM) by H. Rohrer and G. Binnig in 1982. The STM, which is disclosed for example in the patent U.S. Pat. No. 4,343,993, triggered the development of a huge variety of instruments. These instruments are designed to investigate and manipulate surfaces and/or atoms or molecules placed on top of them with atomic resolution, i.e., with resolution from 100 nm down to 0.1 nm. A common feature of scanning probe instruments is a fine tip, the probe, with a radius of curvature at its apex of 100 nm or below. The probe is scanned over the surface of a sample by using coarse and fine positioning units which will be described in detail below. Its in principle a simple to implement technique together with its extreme resolution made the STM and its derivatives up to now widely employed scientific tools when dealing with all kinds of surface analysis and imaging of sub-microscopic phenomena.

Besides the STM, scanning probe techniques include the Atomic Force Microscope (AFM), which was invented by G. Binnig in 1986 (U.S. Pat. No. 4,724,318) and subsequently further developed (see for example: U.S. Pat. No. 5,144,833). Images of magnetic domains have been obtain by Magnetic Force Microscopy, as described by H. J. Mamin et al. in: Appl. Phys. Lett. 55 (1989), pp. 318ff. A Scanning Capacitance Microscope is known from the patent U.S. Pat. No. 5,065,103, a Scanning Acoustic Microscope from U.S. Pat. No. 4,646,573, and a Scanning Thermal Profiler from U.S. Pat. No. 4,747,698. The scanning probe techniques is also used in light microscopes having a resolution not limited by diffraction. In these so-called Scanning Near-field Optical Microscopes, described for example in U.S. Pat. No. 4,604,520, the probe essentially consist of a waveguide for light waves ending in a tiny aperture which either receives or emits light within the proximity of the surface of a sample. For the purpose of this invention, all these as well as related techniques are referred to as scanning probe microscopy (SPM).

However, the SPM crucially depends on an accurate scanning system which provides for positioning and scanning the probe or tip relatively to the surface of a sample. By convention, the directions within a plane parallel to the surface are denoted by 'x' and 'y', whereas the direction perpendicular to this plane is commonly referred to as 'z-axis'. As is immediately obvious, the scanning system has a decisive impact upon the resolution of the scanning probe device. For achieving atomic resolution, it must be able to perform controllable displacements with an accuracy of 0.1 nm or less with the requirements for the z-direction being more vigorous than those for the other directions. An ideal scanning system for scanning probe devices should combine a large scanning range in the x,y-plane with an accurate control of the position of the tip relative to the sample in all three dimensions, but in particular in z-direction. As both requirements are difficult to fulfill, all known SPM devices apply a two-stage positioning system: a coarse positioner moves the sample close to the probe until the distance ranges can be covered by a fine scanner. The fine scanner alone delivers the required accuracy and thus enables imaging and manipulation with atomic resolution. Many different approaches and techniques have been applied for coarse positioning, including a manual approach using levers or differential springs, a piezo-electric walker mechanism (louse), or a stepping motor coupled to the sample or scanning stage. Magnetic coarse positioners are described for example in the European patent EP-B-0 290 522 and in the US patent U.S. Pat. No. 4,947,042. The most advanced types of coarse positioner, in particular when controlled by interferometry, achieve a positioning precision of a few tenth of a micrometer and, thus, barely overlap with the scanning range of the fine scanner.

Fine scanning techniques from the very beginning of scanning probe microscopy converged to using piezoelectric elements. Examples for fine scanning stages are for example known from the patent U.S. Pat. No. 4,520,570 and front G. Binnig and D. P. E. Smith, "Single tube three-dimensional scanner for scanning tunneling microscopy", published in Rev. Sci. Instruments 57 (1986), p. 1688. C. Gerber and O. Marti further proposed a magnetostrictive scanner in IBM's Technical Disclosure Bulletin Vol. 27, No. 11, April 1985, p. 6373, in which the piezoelectric elements are replaced by rods of magnetostrictive material. This material elongates and contracts under the influence of an magnetic field similar to the behavior of a piezoelectric element in an electric field. It is important for the scope of this invention to notice that even those techniques which apply a magnetic-based coarse positioning stage, e.g. patents EP-B-0 290 522 and U.S. Pat. No. 4,947,042, rely upon a piezoelectric fine scanner.

Though the piezoelectric fine scanner is a versatilely applicable tool, it shows several disadvantages. Primarily, it requires a complex and accurate control system for applying the necessary voltages to the electrodes attached to the piezoelectric material. Secondly, the elongation which can be achieved range around 2 to 5 nm/V, i.e., a voltage of 1000 V is required to achieve a scan range of 2 to 5 micrometer, which for all practical purposes limits the range to a few micrometers. In addition, with an increasing voltage, non-linear effects become noticeable with the elongation of the piezoelectric material being no longer proportional to the applied voltage.

The described examples are meant to illustrate the broad usage of scanning probe techniques but do not cover all applications feasible for the invention. It is, for example, known to a skilled person that the storage density of common storage devices, such as hard disks, is directly depending on of the accuracy at which a write/read head can be positioned in relation to the storage medium. It is obvious that an inexpensive, accurate method of positioning the write/read head with atomic precision has an immediate impact in this technical field.

Therefore, it is an object of the current invention to provide a reliable, accurate and easy-to-use fine positioning apparatus, especially suitable for scanning probe instruments and digital data storage devices. It is a particular object of the invention to provide such a fine scanner which is able to control and alter the position of the surface of a sample or the storage medium relatively to the probing tip or read/write head with an accuracy or resolution of at least 100 nm, preferably of 100 nm to 0.01 nm or even 10 nm to 0.1 nm.

SUMMARY OF THE INVENTION

It is a first characteristic feature of the invention that the fine positioner comprises an actuator based on the well-known principle of magnetic induction/magnetomotive force. The effect of magnetic induction is characterized by the force that a magnetic field or the change of a magnetic field exerts upon a magnet, a current carrying conductor or an otherwise magnetized material within this field. Commonly known applications of this principle are for example inductive loudspeakers and microphones. One of the advanced applications of the inductive or magnetomotive force is the positioning system used for the read/write heads of a hard disk. But as mentioned above, these applications differ in accuracy or resolution by at least an order of magnitude from a device according to the current invention. The inductive actuator preferably comprises electric conductor means, as for example a solenoid, and/or permanent magnets. The current invention from the known magnetoresistive positioners, in that the magnetoresistive effect changes the dimension of a magnetic body, whereas a moving part of an inductive actuator is displaced as an entity. The use of an inductive actuator has the advantage of being easily moveable by applying low voltages, whereas the known piezoelectric based technology requires voltages which can be dangerous for an unexperienced user. The components of inductive actuators are inexpensive and suitable for mass-production.

It can be regarded as the gist of the invention that no attempt has been made to increase the sensitivity of the electronic control up to a level at which inductive actuator might be moved with atomic precision. Instead the amount of current used for moving the tip and sample relatively to each other is increased or magnified by mechanical means to a level readily detectable by conventional electronic equipment. In other words, the electronic amplifier is replaced by reducing gear means. The reducing gear means is based on a leverage system or on damping or friction increasing elements to gear down the movement of the inductive actuator. In both cases the amount of current necessary for moving the probe or the sample is substantially increased.

It is therefore a feature of a variant of the invention that the inductive actuator comprises damping means. In contrast to known applications of inductive actuators, in which damping is sought to be reduced to a minimum, the current invention introduces a damping mechanism in a controlled manner. The damping effectively increases and, thus, magnifies the power to be supplied to the actuator in order to achieve a desired movement. The power is directly proportional to the current applied to the actuator. Therefore all relevant control and actuating signals, e.g. currents and voltages, are increased up to a level at which they can be easily manipulated. This feature has an additional effect of lowering the required precision of the involved electric circuitry, such as feedback loops, amplifiers, etc.

As a preferred embodiment of this variant of the invention, the moving part of an inductive actuator is coupled to a bearing or a support structure, in particular to the static part of the actuator, by a high-viscous medium. This viscous coupling has a damping effect, which increases the amount of power supplied to the inductive actuator compared to a free-moving actuator for an equal displacement. This effect increases the control and actuating signals/ currents applied for positioning. Preferably, a high-viscous medium with a good heat conductance is used, in which case the medium can be efficiently used to cool the actuator. The viscosity of the material is preferably chosen to lie in the range of 10 to 100,000 Stokes. Suitable materials include polymers, in particular organosiloxane polymers or silicones.

In another variant of the invention the inductive actuator is coupled to means chosen from a group comprising levers, flexible elements, such as springs, or other transmission means. Thus, control and actuating signals and any errors or variations, thereof, are equally demagnified, resulting in the desired accuracy of the movement. When applying said means care has to be taken to limit any vibration. Therefore, in a preferred embodiment of this variant, a spring or a set of springs is used to demagnify the moving range of the inductive actuator.

Preferably, the sample holding means or the probing means are coupled to a spring unit having a resonant frequency of more than 1 kHz, preferably more than 5 kHz. An upper limit for the resonant frequency may be 100 kHz depending on the applied material and spring design. The resonant frequency is an important feature as device with a resonant frequency easily couples to oscillations of the surroundings. Thus making it difficult to achieve atomic resolution. The spring unit is in turn driven by the inductive force.

In another embodiment of the invention, the position of the moving part of the magnetic actuator relative to the static part of the actuator is additionally controlled and stabilized by a feedback loop. This feedback loop preferably comprises a strain gauge for determining the position of the moving part. As a consequence of the mechanical amplification, the accuracy of this feedback loop and its position determining means does not necessarily have to provide atomic resolution, itself. This feedback loop however should not be confused with the one required to operate a SPM, i.e. the one which stabilizes the distance between tip and sample.

In another embodiment of the invention, the mechanically amplifying means are switchable between at least two different operation modes. Thus, it becomes possible to use the fine positioning apparatus as coarse positioner, too. An SPM with such a fine positioner may not require an additional coarse positioning system. In a preferred embodiment of the invention, the spring constant of a spring used as amplifying means is switchable between at least two different values.

These and other novel features believed characteristic of the invention and its preferred embodiments are set forth in the appended claims. The invention itself however, as well a preferred mode of use, and further objects and advantages thereof, will best be understood by reference to the following detailed description of illustrative embodiments when read in conjunction with the accompanying drawings.

DESCRIPTION OF THE DRAWINGS

The invention is described in detail below with reference to the following drawings.

MODE(S) FOR CARRYING OUT THE INVENTION

Figure 1A:
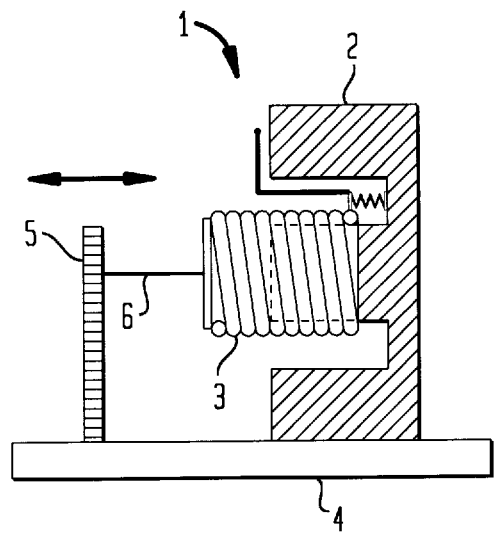
FIG. 1A shows the basic features of an embodiment of a fine positioner using a spring as reducing gear means.

Referring to FIG. 1A, a fine positioning apparatus 1 is shown, comprising a permanent magnet 2 to produce a constant magnetic field. On the core of the permanent magnet 2, is a coil 3 of copper wire. The weight of the coil is approximately 1 g. The coil is connected via a thin flexible wiring to a variable current source (not shown). The permanent magnet 2 is mounted on a base plate 4, which also carries a metal rod 5. The metal rod is connected at its upper end by a stiff wire 6 to the front end of the coil 3.

In operation, an electrical current flows through the coil. The inductive force, which in physical terms is a special case of the Lorentz force, moves the coil 3 within the cage formed by the permanent magnet 2. The force is proportional to the electrical current and to the strength of the magnetic field. Conventional voice coils as used in a loudspeaker system are used in this example. They are damped by a spring with a spring constant of about $2 \times 10^3$ N/m, as derived from a maximum inductive force of about 10N and a peak amplitude of the coil of 5 mm. Considering the weight of the coil being 1 g, the resonant frequency, of system is in the range of several hundred Hertz. The frequency is much to low to provide the stability required for atomic resolution. However, by coupling the rod 5 via the stiff wire 6 to the coil, a spring system with a spring constant in the range of $10^6$ N/m is provided which results in an effective a resonant frequency of at least 1 kHz, enough to protect a sample or a tip from oscillation. The scanning range of the coil 3 is reduced by the spring system to about 20 $\mu$m well within what is achieved by conventional, yet considerably more complex piezoelectric scanners. The shown setup may be designed more compact by directly joining the front end of the coil 3 and the rod 5.

Instead of applying a stiff coupling between the coil 3 and the rod 5, the connection might as well be established by a softer spring, which decouples effectively the coil and the rod with regard to the effective resonant frequency. In this case, the coil regains its full moving range (of 10 mm), while the rod still is bound to a range of 20 $\mu$m, still providing the high resonant frequency as required to achieve atomic precision.

It is obvious to a person skilled in the art that the rod 5 can easily be replaced by other equivalent spring or leverage systems. Moreover, the simple actuator consisting of the coil 3 and the permanent magnet I can be replaced by more sophisticated devices, e.g., the permanent magnet can be replaced by an electromagnet or the magnetic core can be replaced by a rail on which the other magnet, i.e. the one that replaces the coil, is lead to a hovering movement by an appropriate control of the current flowing through it. Further, the top of the rod 5 can be moved with atomic resolution in a plane by connecting it to a second magnetic actuator.

Figure 1B:
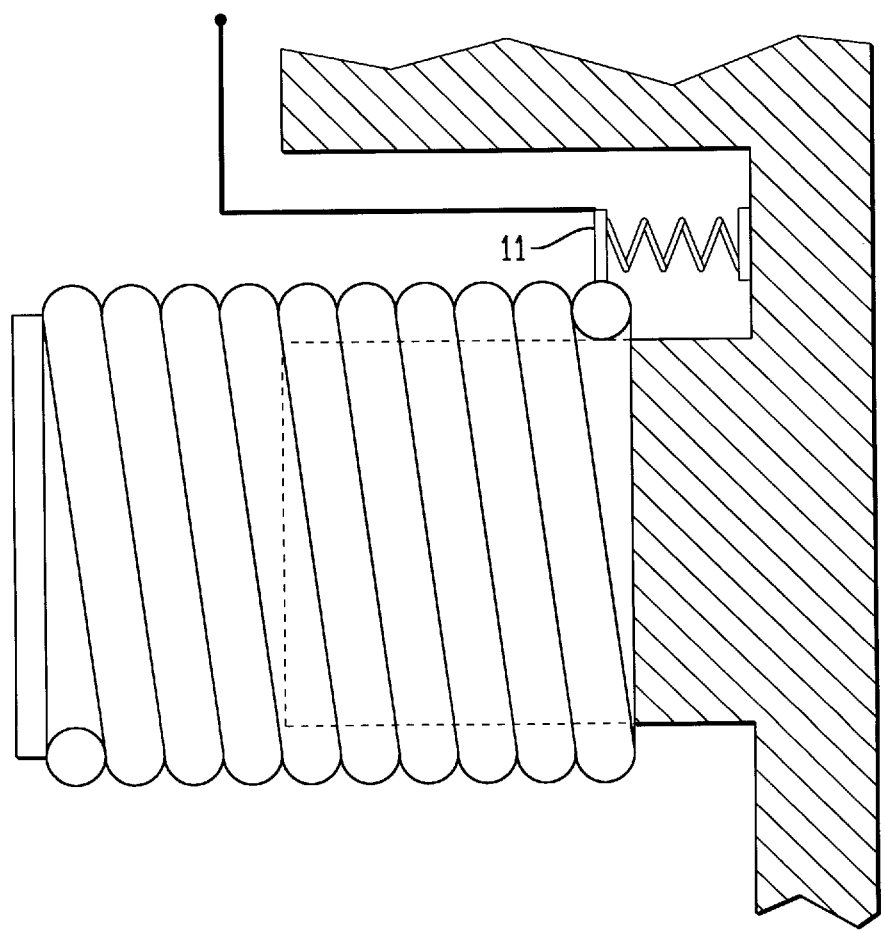
FIG. 1B shows details of an embodiment of a fine positioner in accordance with the invention.

Another variant of the invention is illustrated by FIG. 1B, which shows an enlarged detail view of the coil and the permanent magnet. An elongation meter (or strain gauge) 11 is applied to the coil. The elongation meter transduces the elongation caused by the moving coil into a proportional electric signal. The electric signal is used in a feedback loop to stabilize the position of the coil. This variant is particularly useful if applied to an embodiment of the invention wherein the coil, itself, is moved over its full moving range, i.e., when the coil is decoupled from the tip or sample holder as described above.

Figure 2:
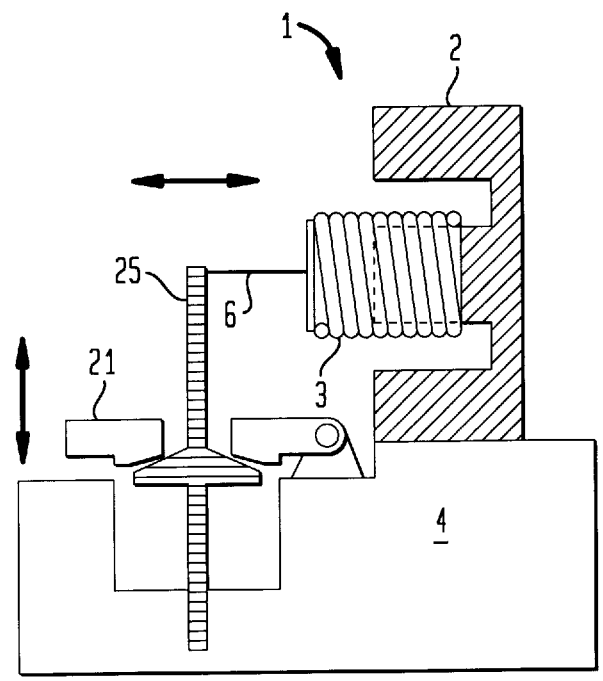
FIG. 2 illustrates a combined coarse and fine positioner in accordance with the invention.

Referring now to FIG. 2, an embodiment of the invention is shown having a flanged rod 25. (Identical or similar parts within FIGS. 1 and 2 are denoted with equal numerals.) When a clamp 21. is fixed to the base plate 4, the rod is immobilized up to the height of the flange. When the clamp is released, the rod can be bent over its entire length. In effect, the spring constant of the rod 25 can be switched by using the clamp between two values, e.g., $10^6$ and $10^5$, corresponding to a scanning range of 20 $\mu$m and 200 $\mu$m, respectively. Though the coarse scan might not provide atomic resolution, the spring can be moved over a large range.

Figure 3:
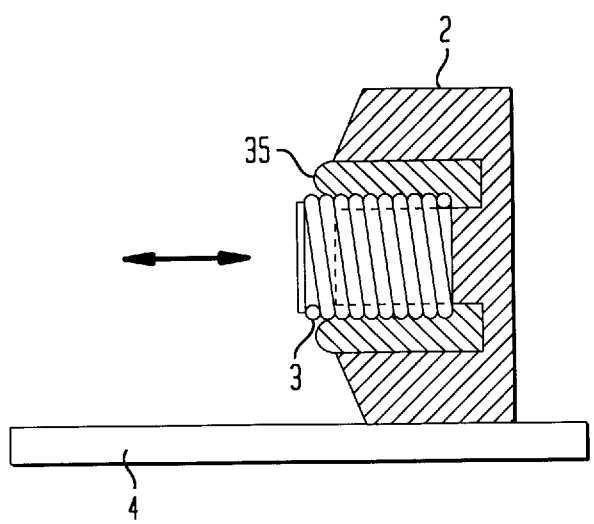
FIG. 3 illustrates another embodiment wherein the range of motion of the inductive actuator is restricted by a highly viscous medium.

Another embodiment of the invention is shown in FIG. 3, which also combines coarse and fine positioner. Again with respect to the other figures, equal numerals denote identical or similar parts. In this embodiment, the spring or rod of FIG. 1A is replaced by a high-viscous (e.g. silicon) polymer 35. The silicone polymer exerts only a minor restoring force upon the coil 3, but it provides a large friction between the moving coil and immobile part of the actuator. With this setup, a sample for example fixed to the front end of the coil 3 can be positioned within a maximum range of about 1 mm and with an accuracy of below 0.2 nm. It is advantageous to use a silicone polymer, as its high heat conductance and thermal durability facilitate the cooling of the device. Thus, the coil can be powered by a higher current. In this particular embodiment, the tip, the sample holder, or the sample itself is advantageously attached to the front end of the coil 3. Again, variations concerning the high-viscous material and the shape of coil and support structure are feasible.

Figure 4:
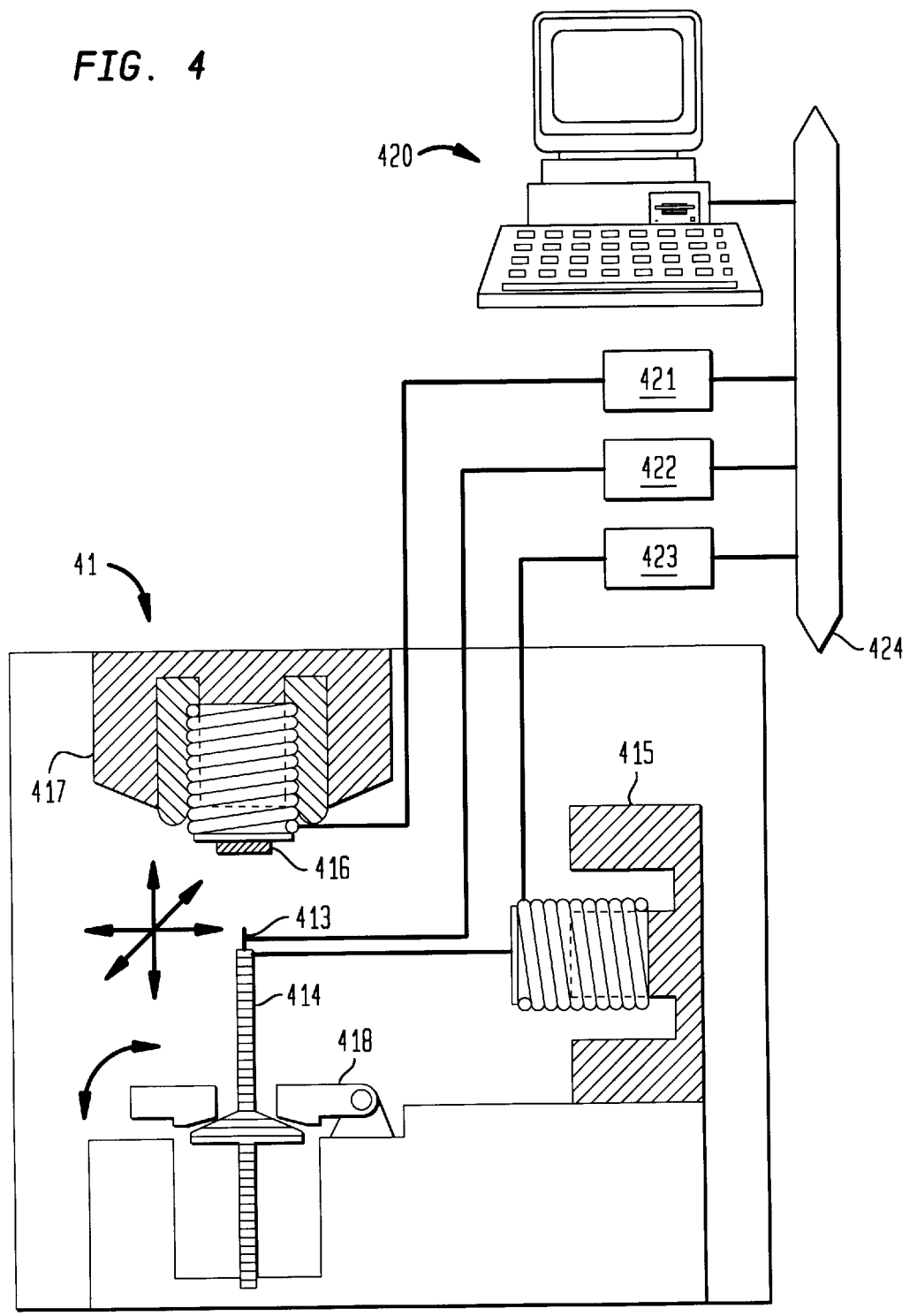
FIG. 4 shows a fine positioner for three dimensions.

Referring now to FIG. 4, the basic elements of a scanning tunneling microscope according to the current invention are shown. It should be noted that the elements of FIG. 4 are not drawn to scale. The illustrated microscope comprises a combined fine and coarse positioning unit 41, a central processing unit 420, and peripheral electric equipment. The positioning unit 41 is isolated from external vibration by a suitable damping system (springs, viton packets, etc.) in a manner known to a skilled person. A tunneling tip or probe 413 is fixed to the top end of a rod 414. The rod is moved in x-direction by a first (x-) inductive actuator 415. The movement in y-direction is done by a second (y-) inductive actuator, which is not shown. When suitable programmed, both actuators together perform a scanning movement of the tip in the x,y-plane. A sample 416 is attached to the front end of a moving coil of another (z-) inductive actuator 417, which is of the polymer-dampened type described above when referring to FIG. 3. The z-actuator alters the distance between tip and sample. The peripheral electric and electronic components comprise a programmable d.c. supply 421, 422 controlled via the data and control signal bus 424 by a central processing unit 412 for each of the inductive actuators 415, 417. They further include amplifiers, A/D and D/A converters. The tip 413 and the sample 416 are attached to means 423 for providing a voltage and for measuring the tunnel current between both. The measured tunnel current is the input for a feedback loop which is applied to control the z-actuator 417, i.e., the distance between the tip 413 and the sample 416.

Figure 5:
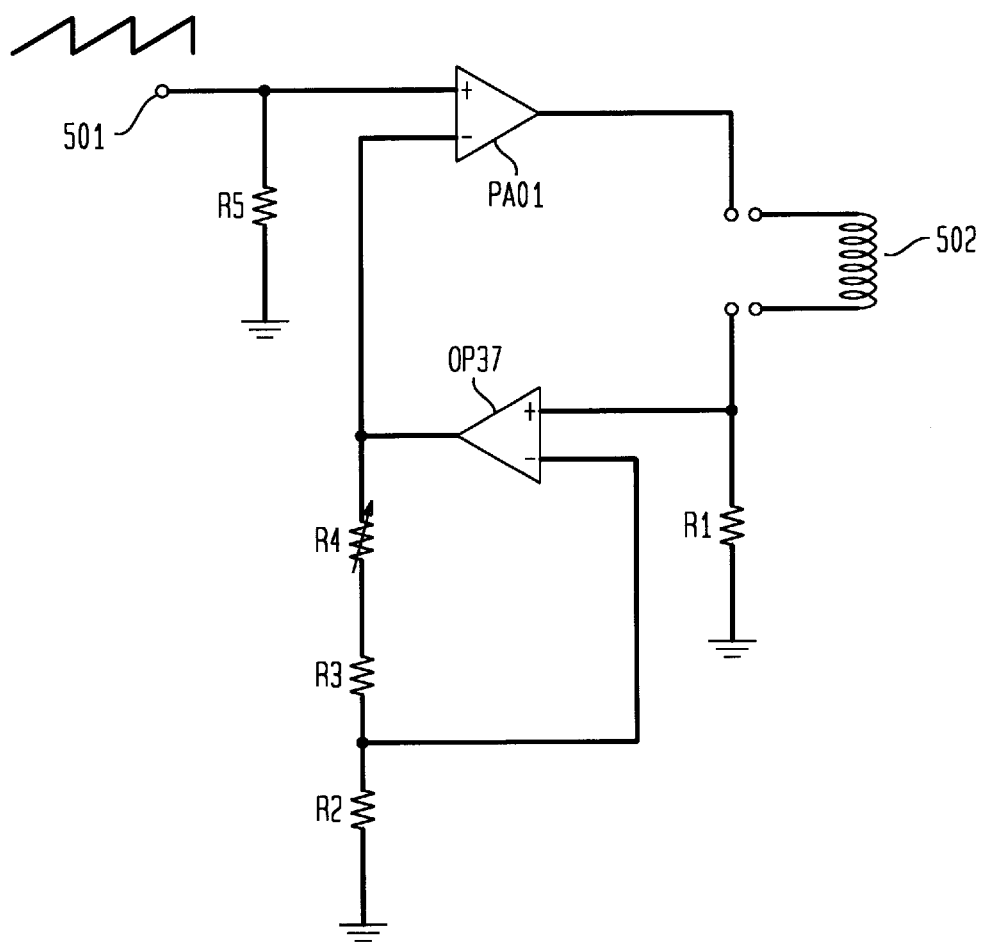
FIG. 5 shows part of an electronic circuitry used to control a fine positioner.

Details of the electronic circuitry are shown in FIG. 5. A voltage applied to the input 501 determines the current flow through the coil 502 via the power amplifier PA01. A feedback loop, mainly consisting of an operational amplifier OP37 stabilizes the current through the coil, thus, providing a well controllable magnetic force to the actuator. The circuitry further involves several resistors R1–R5 having resistivities of 0.1 $\Omega$, 100 $\Omega$, 9 k$\Omega$, 2 k$\Omega$ (adjustable), and 10 k$\Omega$, respectively.

In operation, the sample is positioned with an accuracy of fractions of a millimeter in juxtaposition to the tip. A voltage of several hundreds volts is applied to the tip and the sample. A current through the coil of the z-actuator 417, is generated until a tunnel current between is measured. Then the feedback loop is activated to control the distance with an accuracy of 0.01 nm to 0.1 nm. The d.c. supply circuit 422 for the x-actuator and for the corresponding actuator for the y-direction (not shown) receive input control signals from the central processing unit 420 according to a predetermined and programmed scanning scheme. With the release of a bolt 418, the rod 414 is switched to a lower spring constant enabling a large displacement between tip-and sample in the x,y-plane. The tip 413 can then be placed in juxtaposition of another part of the surface of the sample 416. After terminating this displacement step, the bolt 418 is again clamped against the flange of the rod. And the programmed scan matrix is repeated. The central processing unit 420 further provides image processing means for translating the tunnel current, i.e., the measured heights, into an image of of the surface of the scanned sample.

By replacing the tip 413 and the corresponding feedback loop, which is based on the detection of the tunnel current between tip and sample, by a cantilever and means to detect the deflection of a cantilever, the described fine positioning means are applied to an atomic force microscope. The fine positioner may be adapted to other SPM techniques in a similar manner by replacing the feedback scheme accordingly.

We claim:

1. In a fine-positioning apparatus for altering a relative position between a probing means and a sample-holding means with atomic resolution between 100 nm to 0.01 nm, an improved actuator means which comprises:

a hollow coil and magnetic means, both being movable relative to each other in a predetermined motion range, said magnetic means having one of its magnetic poles located at one end of a longitudinal element which extends with said end into the cavity of said coil so that the inhomogeneous field at said end of said longitudinal element is essentially surrounded by said coil through essentially the whole motion range; and mechanical means which increases the amount of current used for moving said hollow coil and said magnetic means relative to each other, said mechanical means comprising spring means and a damping means of a highly viscous material which provides friction between said coil and said magnetic means to increase the energy dissipation of said actuator means during the relative motion between said magnetic means and said coil.

2. The fine-positioning apparatus in accordance with claim 1, wherein said highly viscous material is a silicon-based polymer.

3. The fine-positioning apparatus in accordance with claim 2 including displacement control means to measure and control the displacement of said actuator means.

4. The fine-positioning apparatus comprising:

z-axis positioning means to alter the relative position between a sample-holding means and a probing means in a plane essentially vertical to said sample-holding means, said z-axis positioning means comprising first actuator means coupled to a first support means, said first actuator means comprising a first hollow coil and first magnetic means, both being movable relative to each other in a predetermined motion range, said first magnetic means having one of its magnetic poles located at one end of a longitudinal element which extends with said end into the cavity of said first hollow coil so that the inhomogeneous field at said end of said longitudinal element is essentially surrounded by said first hollow coil in essentially the whole motion range, said z-axis positioning means further comprising damping means which provides a friction between said first hollow coil and said first magnetic means to increase the energy dissipation of said first actuator means during the relative motion between said first magnetic means and said first coil, said damping means being a highly viscous material, and comprising x/y-axis positioning means to alter the relative position between said sample-holding means and said probing means in a plane essentially parallel to said sample-holding means, said x/y-axis positioning means comprising second actuator means coupled to a second support means, said second actuator means comprising a second hollow coil and second magnetic means, both being movable relatively to each other in a predetermined motion range, said second magnetic means having one of its magnetic poles located at one end of a longitudinal element which extends with said end into the cavity of said second hollow coil so that the inhomogeneous field at said end of said longitudinal element is essentially surrounded by said second hollow coil in essentially the whole motion range thereof and further comprising spring means which counteracts the relative motion between said second magnetic means and said second coil.

5. The fine-positioning apparatus in accordance with claim 4 including displacement control means to measure and control the displacement of said actuator means.

6. A scanning probe microscope comprising:

a sample holding means a tunnelling probing means fine-positioning apparatus comprising z-axis positioning means to alter the relative position between the sample-holding means and the probing means in a plane essentially vertical to said sample-holding means, said z-axis positioning means comprising first actuator means coupled to a first support means, said first actuator means comprising a first hollow coil and first magnetic means, both being movable relative to each other in a predetermined motion range, said first magnetic means having one of its magnetic poles located at one end of a longitudinal element which extends with said end into the cavity of said first hollow coil so that the inhomogeneous field at said end of said longitudinal element is essentially surrounded by said first hollow coil in essentially the whole motion range thereof, said z-axis positioning means further comprising damping means which provides a friction between said first hollow coil and said first magnetic means to increase the energy dissipation of said first actuator means during the relative motion between said first magnetic means and said first coil, said damping means being a highly viscous material, and comprising x/y-axis positioning means to alter the relative position between said sample-holding means and said probing means in a plane essentially parallel to said sample-holding means, said x/y-axis positioning means comprising second actuator means coupled to a second support means, said second actuator means comprising a second hollow coil and second magnetic means, both being movable relative to each other in a predetermined motion range, said second magnetic means having one of its magnetic poles located at one end of a longitudinal element, which extends with said end into the cavity of said second hollow coil so that the inhomogeneous field at said end of said longitudinal element is essentially surrounded by said second hollow coil in essentially the whole motion range and further comprising spring means which counteracts the relative motion between said second magnetic means and said second coil, and computer displacement control means to measure and control the displacement of said actuator means.

7. In a fine-positioning apparatus for altering a relative position between a probe and a sample-holder in a scanning probe microscope, a current activated transducer for providing a motive force to scan a sample with atomic resolution between 100 nm to 0.01 nm, said transducer comprising:

a hollow coil and a magnetic element being movable relative to each other in a predetermined motion range, said magnetic means having one of its magnetic poles located at one end of a longitudinal element which extends with said end into the cavity of said coil so that the inhomogeneous field at said end of said longitudinal element is essentially surrounded by said coil through essentially the whole motion range; and a mechanism activated by the movement of said hollow coil to increase the magnitude of the current needed to move said hollow coil and said magnetic element relative to each other.

8. The fine-positioning apparatus of claim 7, wherein said mechanism comprises a viscous material which provides a friction to increase the energy dissipation of said transducer during the relative motion between said magnetic element and said coil.

9. The fine positioning apparatus of claim 7 wherein said fine positioning apparatus is an X-Y scanner and said coil is attached to the probe through the mechanism and activates the probe to produce the scanning pattern.

10. The fine-positioning apparatus in accordance with claim 7, wherein said mechanism comprises a spring leaf pivoted at one end and having the probe mounted on the opposite end.

11. The fine-positioning apparatus in accordance with claim 10, wherein: said spring is attached to the coil by a mechanical connection intermediate the one and opposite ends.

12. The fine-positioning apparatus in accordance with claim 11, wherein said spring has movable stops to provide different ranges of motion to the probe one restricted range during scanning and another less restricted range during motion between scans.

13. A scanning probe microscope comprising:
a) a sample holder
b) a tunnelling probe
c) fine-positioning apparatus comprising:
   i) z-axis positioner with a first actuator to alter the relative position between the sample-holder and the probe in a plane essentially at right angles to said sample-holder, said first actuator comprising a first hollow coil and first magnetic element being movable relative to each other in a predetermined motion range, said first magnetic element having one of its magnetic poles located at one end of a longitudinal element which extends with its said end into the cavity of said first hollow coil so that the inhomogeneous field at said end of said longitudinal element is essentially surrounded by said first hollow coil in essentially the whole motion range of the coil;
   ii) a x/y-axis positioner with a second actuator to alter the relative position between said sample-holder and said probe in a plane essentially parallel to said sample-holder, said second actuator comprising a second hollow coil and second magnetic element both being movable relative to each other over a predetermined motion range, said second magnetic element having one of its magnetic poles located at one end of a second longitudinal element, which extends with its said one end into the cavity of said second hollow coil so that the inhomogeneous field at said end of said longitudinal element is essentially surrounded by said second hollow coil in essentially the whole motion range; and d) computer displacement control means to measure and control the displacement of said actuator means.

14. The scanning probe microscope of claim 13 wherein said first and second actuators each have a mechanism activated by movement of said hollow coil to increase the magnitude of the current needed to move the hollow coils and magnetic elements relative to each other.

15. The scanning probe microscope of claim 14 wherein the mechanism of the first actuator comprises a viscous material which provides a friction to increase energy dissipation of the first actuator.

16. The scanning probe microscope of claim 15 wherein said mechanism of the second actuator is a leaf spring with the probe mounted at one end and fixed to the coil intermediate said one end and a pivot point of the spring.

17. The fine-positioning apparatus in accordance with claim 16, wherein said spring has movable stops to provide different ranges of motion to the probe one restricted range during scanning and another less restricted range during motion between scans.

18. The scanning probe microscope of claim 16 wherein the mechanism of the first actuator comprises a viscous material which provides a friction to increase energy dissipation of the first actuator.

* * * * *